Aug. 11, 1953 W. A. BEDFORD, JR 2,648,410
FASTENING DEVICE
Filed Aug. 1, 1951

INVENTOR:
WILLIAM A. BEDFORD JR.,
BY Robert E Ross
AGENT.

Patented Aug. 11, 1953

2,648,410

UNITED STATES PATENT OFFICE 2,648,410

FASTENING DEVICE

William A. Bedford, Jr., North Scituate, Mass., assignor to United-Carr Fastener Corporation, Cambridge, Mass., a corporation of Massachusetts Application August 1, 1951, Serial No. 239,816

2 Claims. (Cl. 189—36)

This invention relates generally to fastening devices, and has particular reference to a fastener for retaining a resilient member in superimposed relation on a support plate.

The object of the invention is to provide a fastening device for assembly over the edges of a superimposed support plate and resilient member which has means for engaging the resilient member and means for snapping engagement with a flanged edge portion of the support plate.

A further object of the invention is to provide a one-piece sheet metal fastener having a U-shaped body with a pair of spaced legs for straddling a superimposed resilient member and a support member, in which one of the legs has means for engagement with the resilient member and also has means for snapping engagement with a flanged edge of the support member.

Other objects of the invention will, in part, be obvious, and will, in part, appear hereinafter.

Figure 1:
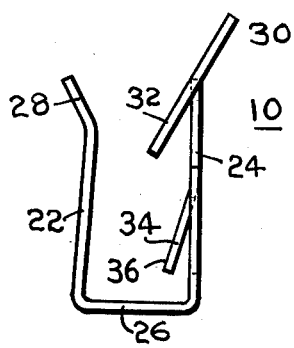
Fig. 1 is a view in side elevation of a fastening member embodying the features of the invention.
Figure 2:
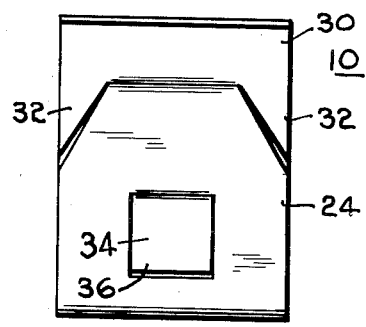
Fig. 2 is a view of the fastening member of Fig. 1 as seen from the right side.

Referring to the drawing, there is illustrated a fastening device 10, which is particularly adapted for use in securing a resilient member 12 into a superimposed position onto a support member 14.

The resilient member 12 is preferably formed of relatively stiff rubber or plastic, and in the construction of automobiles, is secured to the support so as to extend outwardly and upwardly therefrom, with the upper end resting against the automobile bumper 16, to act as a stone shield. The support 14 may conveniently be provided with a flanged edge 18, and the resilient member is superimposed on the support plate so that the lower edge 20 of the resilient member substantially abuts the flanged edge.

The fastener 10 is preferably formed of a single piece of stiff but flexible sheet metal, and is generally U-shaped, with a pair of spaced legs 22 and 24 which are joined at one end by a connecting base 26. The leg 22 initially extends inwardly toward the other leg 24, and then turns outwardly to form a flared free end portion 28. The leg 24 is substantially straight throughout its lower portion, and is also provided with a flared free end 30, with pointed tongues 32 extending inwardly from the innermost portion thereof which are inclined toward the base. The arm 24 is also provided with a snap fastener tongue 34 which is formed therein near the base, and extends inwardly and is inclined toward the base, to terminate in a free end 36.

Figure 4:
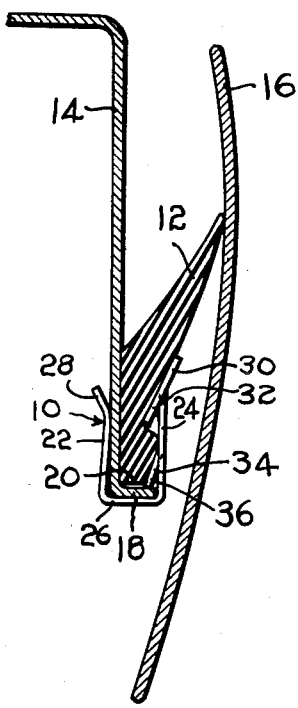
Fig. 4 is a view in section of a support member and superimposed resilient member assembled by means of the fastener of Fig. 1.
Figure 3:
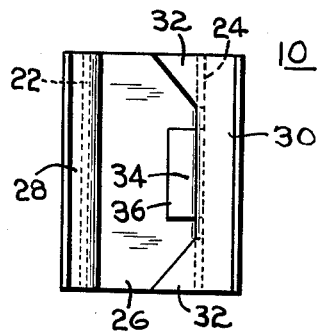
Fig. 3 is a view of the fastening member of Fig. 1 as seen from the top.

To assemble the fastener, the resilient member is positioned against the support as illustrated in Fig. 4, and the fastener 10 is forced over the edge of the support so that the legs 22 and 24 straddle the flanged edge 18. The leg 24 bears against the resilient member, and the leg 22 springs outwardly, causing the tongues 32 to dig into the surface of the resilient member. As the base 26 seats against the flanged edge 18, the snap fastener tongue 34 snaps over the flanged edge so that the free end 36 is positioned therebehind to retain the fastener in assembly thereon. Since the legs 22 and 24 are spaced apart near the base a distance substantially equal to the width of the flanged edge 18 twisting movement of the fastener relative to the support which would tend to dislodge the fastener is prevented. The arm 24, in addition to engaging the resilient member by means of the tongues 32, also forces the resilient member firmly against the support to assist in preventing lateral movement thereof relative to the support.

The fastener is particularly adapted to rapid manufacture on automatic machines from a continuous strip of sheet metal, and may be rapidly and economically assembled without the use of special tools.

Since certain obvious modifications may be made in the device without departing from the scope of the invention, it is intended that all matter contained herein be interpreted in an illustrative and not in a limiting sense.

I claim:

1. A fastener assembly, comprising a support plate having a flange along one edge, a resilient member superimposed on one side of the support and seated on the flange, said resilient member being exposed on the side opposite the support, and a U-shaped fastening clip assembled therewith retaining the resilient member on the support, said clip comprising a pair of arms resiliently embracing the support and the resilient member and a connecting portion joining said arms around the flange, one of said arms bearing against the resilient member and having a pair of longitudinally spaced tongues which extend generally toward the connecting portion and are inclined toward the other arm, the tongue nearest the end of said arm digging into engagement with the resilient member, the other tongue being snapped over the edge of the flange, said other arm being substantially smooth throughout its length.

2. A fastener assembly, comprising a support plate having a flange at one edge which extends substantially normal thereto, a resilient rubberlike member superimposed on the side of the support having the flange and being seated against the flange, said resilient member being exposed on the side opposite the support, and a U-support fastening clip formed of resilient sheet metal retaining the resilient member on the support, said clip comprising a pair of collateral arms normally spaced apart less than the combined thickness of the support and the resilient member, said arms embracing the support and the resilient member so that one arm bears against the support and one arm bears against the resilient member, said arms being joined by a connecting portion extending around the flange, the arm bearing against the resilient member having an outwardly inclined end portion and a pair of tongues formed in the edges thereof which are inward extensions of the outwardly inclined end portion so as to extend generally toward the connecting portion and to be inclined toward the other arm, said tongue being disposed in digging engagement with the resilient member, and a locking tab formed from the same arm in longitudinal spaced relation to the tongues, said tab extending generally toward the connecting portion and being inclined toward the other arm, and being disposed in snapping engagement over the edge of the flange, said other arm being substantially smooth throughout its length and having an outwardly inclined end portion.

WILLIAM A. BEDFORD, Jr.

References Cited in the file of this patent

UNITED STATES PATENTS

| Number    | Name         | Date           |
|-----------|--------------|----------------|
| 2,091,859 | Johnson      | Aug. 31, 1937  |
| 2,093,727 | Julien       | Sept. 21, 1937 |
| 2,184,553 | Johnson et al.| Dec. 26, 1939 |
| 2,216,219 | Wiley        | Oct. 1, 1940   |
| 2,240,181 | Fairbank     | Apr. 29, 1941  |
| 2,525,595 | Fergueson    | Oct. 10, 1950  |